United States Patent
Wu et al.

(10) Patent No.: US 12,554,424 B2
(45) Date of Patent: Feb. 17, 2026

(54) POWER-OFF MONITOR FOR RELAXED BLOCK RETIREMENT IN A MEMORY SUB-SYSTEM

(71) Applicant: Micron Technology, Inc., Boise, ID (US)

(72) Inventors: Fanqi Wu, Sunnyvale, CA (US); Kevin R. Brandt, Boise, ID (US); Zhenlei Shen, Milpitas, CA (US); Tingjun Xie, Milpitas, CA (US); Yang Liu, San Jose, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/662,952

(22) Filed: May 13, 2024

(65) Prior Publication Data

US 2024/0393969 A1   Nov. 28, 2024

Related U.S. Application Data

(60) Provisional application No. 63/468,986, filed on May 25, 2023.

(51) Int. Cl.
*G06F 3/06* (2006.01)
(52) U.S. Cl.
CPC .......... *G06F 3/0634* (2013.01); *G06F 3/0604* (2013.01); *G06F 3/064* (2013.01); *G06F 3/0679* (2013.01)

(58) Field of Classification Search
CPC ...... G06F 3/0679; G06F 3/064; G06F 3/0604; G06F 3/0634
See application file for complete search history.

(56) References Cited

U.S. PATENT DOCUMENTS

| | | | |
|---|---|---|---|
| 2011/0302445 A1* | 12/2011 | Byom | G11C 29/883 711/170 |
| 2015/0169398 A1* | 6/2015 | Chunn | G06F 11/3034 714/763 |
| 2017/0052720 A1* | 2/2017 | Chu | G11C 16/3418 |
| 2020/0356438 A1* | 11/2020 | Kim | G06F 11/3058 |
| 2021/0118519 A1* | 4/2021 | Muchherla | G11C 29/88 |
| 2021/0342074 A1* | 11/2021 | Reina | G06F 3/0679 |
| 2022/0206821 A1* | 6/2022 | Devegowda | G06F 9/4401 |
| 2025/0046354 A1* | 2/2025 | Jung | G11C 7/222 |

\* cited by examiner

*Primary Examiner* — Edward J Dudek, Jr.
(74) *Attorney, Agent, or Firm* — Lowenstein Sandler LLP

(57) ABSTRACT

A processing device in a memory sub-system determines a total power-off time of a memory sub-system and identifies a configurable power-off time threshold for the memory sub-system. The processing device determines whether the total power-off time satisfies a threshold criterion based on the configurable power-off time threshold, responsive to determining that the total power-off time satisfies the threshold criterion, causes the memory sub-system to enter a relaxed block retirement mode of operation.

20 Claims, 5 Drawing Sheets

| GROUP | PEC RANGE | THRESHOLD |
|---|---|---|
| PEC_GRP1 | 0-1K | 5 YEARS |
| PEC_GRP2 | 1K-5K | 3 YEARS |
| PEC_GRP3 | 5K-10K | 3 MONTHS |

POWER-OFF MONITOR FOR RELAXED BLOCK RETIREMENT IN A MEMORY SUB-SYSTEM

RELATED APPLICATIONS

This application claims the benefit of U.S. Provisional Patent Application No. 63/468,986, filed May 25, 2023, the entire contents of which are hereby incorporated by reference herein.

TECHNICAL FIELD

Embodiments of the disclosure relate generally to memory sub-systems, and more specifically, relate to a power-off monitor for relaxed block retirement in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
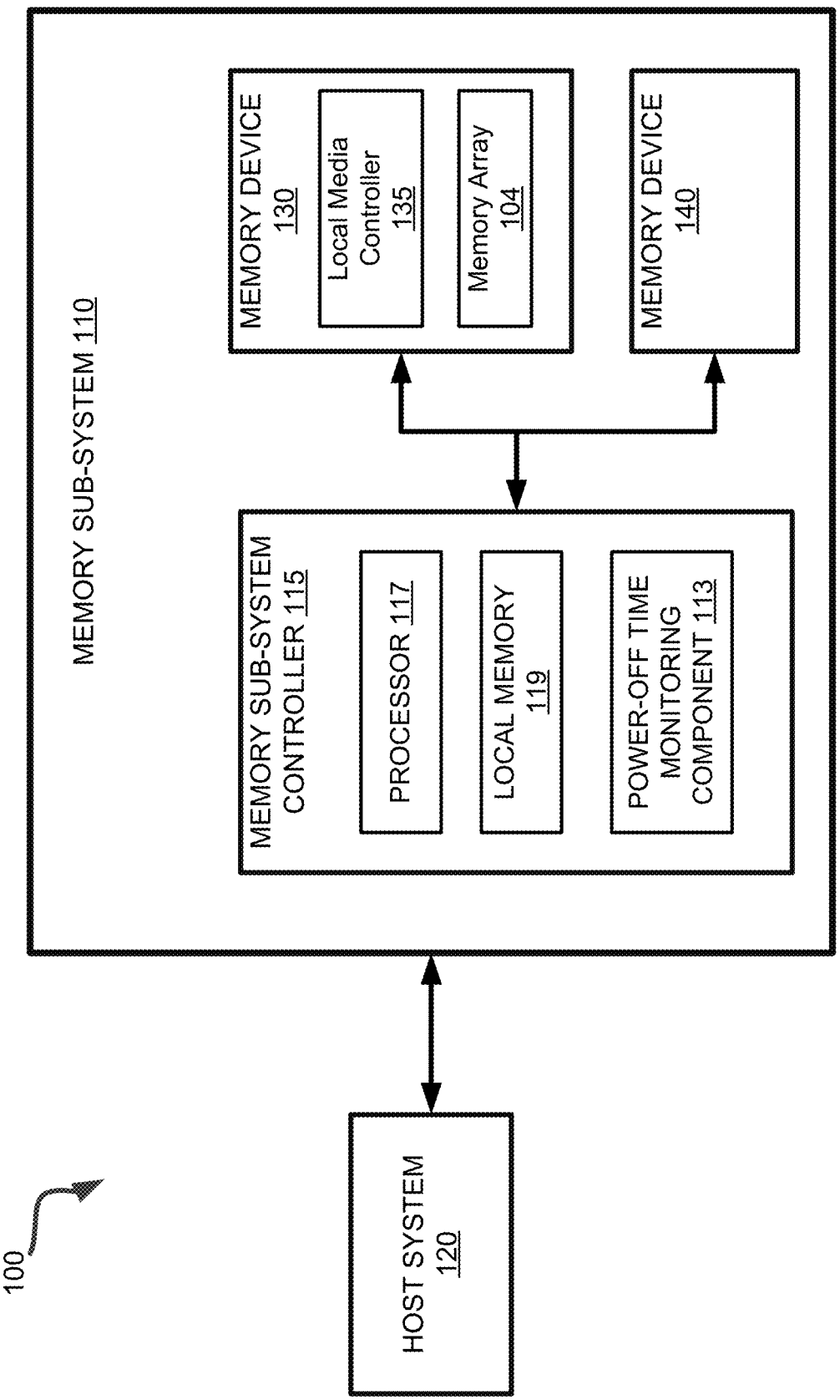
FIG. 1 illustrates an example computing system that includes a memory sub-system in accordance with some embodiments of the present disclosure.

Aspects of the present disclosure are directed to a power-off monitor for relaxed block retirement in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. When data is written to a memory cell of the segment for storage, the memory cell can deteriorate. Accordingly, each memory cell of the segment can handle a finite number of write operations performed before the memory cell is no longer able to reliably store data. The error rate associated with data stored at the data block can increase due to a number of factors, including read disturb, slow charge loss, the passage of time, change in temperature, etc. For example, when data has been stored in the memory cells of a block for an extended period of time (e.g., while the drive is powered off), so called "data retention" stress can lead to significant levels of charge loss during that period of time. When the drive is eventually powered back on, a conventional usage mode might dictate that an attempt is made to recover the data stored in the block so that it can be read and used as needed. Another usage mode can occur when recovery of the data is not desired, but instead the block to be reformatted so that it can be reprogrammed with new data and reused. Although such a usage mode may be in violation of the defined specifications of the drive, which may dictate a certain power-off time after which the data is still recoverable, it may be a practical occurrence for certain users/customers.

Conventional media management algorithms executed at power-on of the drive do not distinguish between the two possible usage modes. Accordingly, the algorithms can attempt to read the data in one or more blocks of the drive, but may fail due to the charge loss attributable to the extended period of power-off time. For example, the charge loss can cause the margins between programming distributions to collapse making the data in different memory cells unreadable. The memory sub-system controller is not able to distinguish between so called "bad blocks" (i.e., blocks that have failed due to deterioration of the underlying physical media) or blocks that have merely suffered significant charge loss due to data retention stress during the periods of power-off time. Accordingly, conventional memory sub-system controllers are forced to retire any blocks that meet a defined bad block criterion (e.g., blocks for which certain uncorrectable error handling steps are triggered), even though such blocks may intrinsically be good blocks that are able to be reformatted and reused. This can detrimentally impact the capacity and life-span of the drive.

Aspects of the present disclosure address the above and other deficiencies by utilizing a power-off monitor for relaxed block retirement in the memory sub-system. In one embodiment, at power-on of the memory sub-system (e.g., an SSD), the memory sub-system controller can determine a total power-off time for the memory sub-system, such as by using power-up and power-down timestamps provided by the host system. The memory sub-system controller can compare the total power-off time to a configurable power-off time threshold, and if the total power-off time meets or exceeds the threshold, can cause the memory sub-system to enter a relaxed block retirement mode. In one embodiment, the power-off time threshold can be variable according to a corresponding program-erase count (PEC), or other usage metric, of the memory sub-system. In the relaxed block retirement mode, the memory sub-system controller does not retire blocks even if they would otherwise meet certain retirement criteria (e.g., if certain uncorrectable error handling steps are triggered during read error recovery due to failure of hard and soft decoding). This forgiveness allows the blocks to be reformatted and reused (e.g., erased and reprogrammed with new data).

Advantages of the approach described herein includes, but is not limited to, improved performance in the memory sub-system. For example, the power-off monitor for relaxed block retirement can support certain customer usage modes by allowing reformatting and reuse of blocks in the memory sub-system after long periods of power-off time. The relaxed block retirement mode prevents unnecessary retirement of intrinsically good blocks which increases capacity and life-span of the memory sub-system. In addition, the techniques described herein preserve system resources by preventing the memory sub-system from entering a permanent read-only mode unexpectedly after long periods of power-off time and avoiding over-provisioning loss due to unnecessary block retirement.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device.

Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes a power-off time monitoring component 113 that can determine whether to implement a relaxed block retirement mode in the memory sub-system 110. In one embodiment, at power-on of the memory sub-system 110, the power-off time monitoring component 113 can determine a total power-off time for the memory sub-system 110, such as by using power-up and power-down timestamps provided by the host system 120. The power-off time monitoring component 113 can compare the total power-off time to a configurable power-off time threshold, and if the total power-off time satisfies a power-off time threshold criterion (e.g., meets or exceeds the threshold), can cause the memory sub-system 110 to enter the relaxed block retirement mode. In one embodiment, the power-off time threshold can be variable according to a corresponding program-erase count (PEC), or other usage metric, of the memory sub-system 110. In the relaxed block retirement mode, the memory sub-system controller 115 does not retire blocks or other segments of memory device 130, even if they would otherwise meet certain retirement criteria (e.g., if certain uncorrectable error handling steps are triggered during read error recovery due to failure of hard and soft decoding). This forgiveness allows the blocks or other segments of memory device 130 to be reformatted and reused (e.g., erased and reprogrammed with new data). Further details with regards to the operations of power-off time monitoring component 113 are described below.

Figure 2:
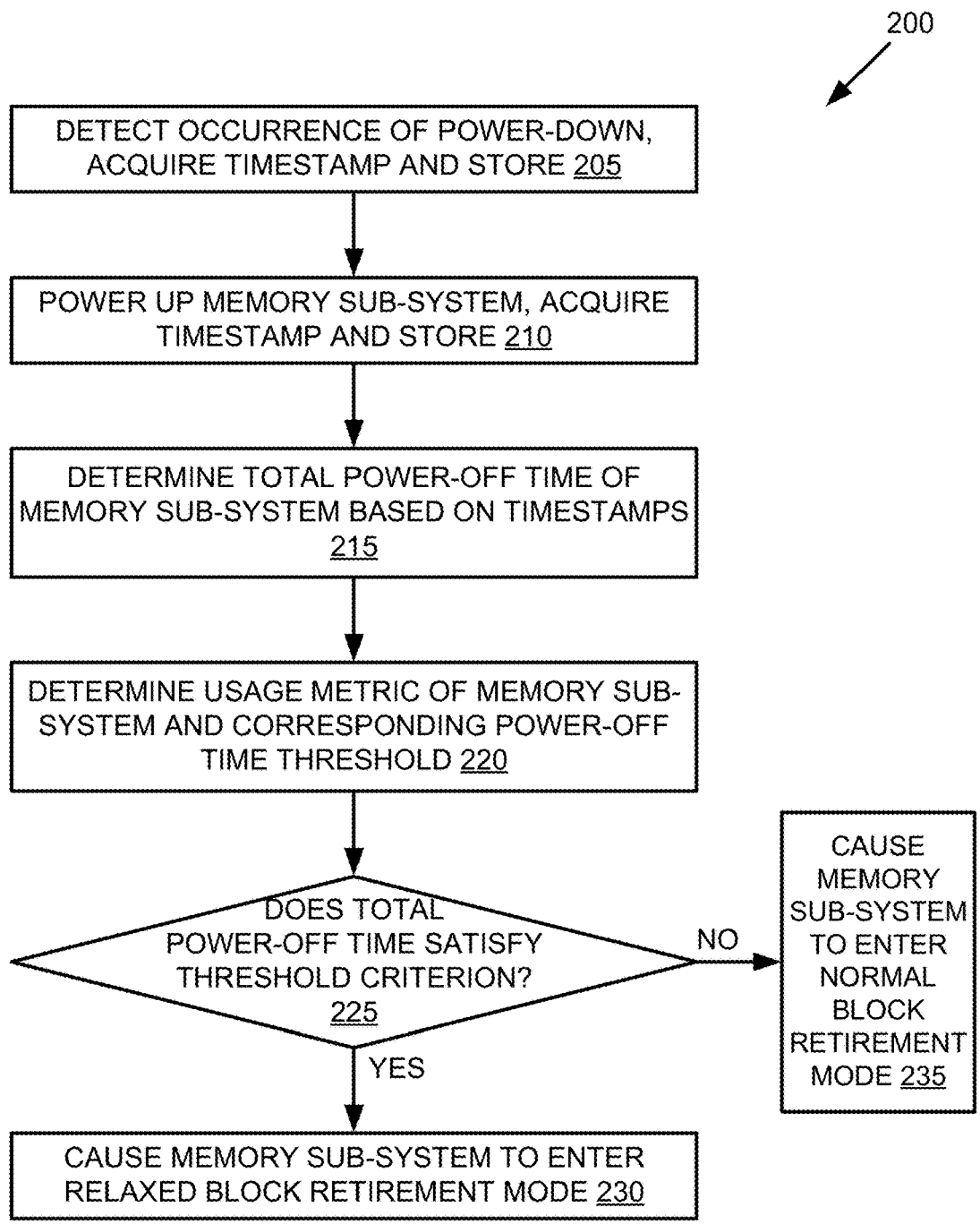
FIG. 2 is a flow diagram of an example method of power-off monitoring for relaxed block retirement in a memory sub-system in accordance with some embodiments of the present disclosure.

FIG. 2 is a flow diagram of an example method of power-off monitoring for relaxed block retirement in a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by power-off time monitoring component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic (e.g., power-off time monitoring component 113) detects an occurrence of a power down event of the memory sub-system 110. The power down event can be either a controlled power down or an asynchronous power loss (APL) event. In a controlled power down, the memory sub-system 110 may receive a command from the host system 120 instructing memory sub-system to power down, or memory sub-system 110 may initiate the power down itself (e.g., according to a predefined schedule or planned operation). An APL event may include an unplanned or unexpected loss of power to memory sub-system 110. In response to detecting the occurrence of the power down event, the processing logic can acquire an indication of a power down time associated with the power down event, and store that indication of the power down time at a designated location, such as in memory device 130. Depending on the embodiment, power-off time monitoring component 113 can receive the indication of the power down time from host system 120 along with a power down command, can request the indication of the power down time from the host system 120 (e.g., by issuing a separate command/request), or can track the power down time itself using an internal clock or timer (not shown).

At operation 210, the processing logic detects an occurrence of a power up event of the memory sub-system 110. For example, after a period of being powered-off, power can be restored to the memory sub-system 110. Depending on the embodiment, the power up event can occur in response to a command from host system 120 or memory sub-system 110 can restore power itself without outside intervention. In response to detecting the occurrence of the power up event, the processing logic can acquire an indication of a power up time associated with the power up event, and store that indication of the up down time at a designated location, such as in memory device 130. Depending on the embodiment, power-off time monitoring component 113 can receive the indication of the power up time from host system 120 along with a power up command, can request the indication of the power up time from the host system 120 (e.g., by issuing a separate command/request), or can track the power up time itself using the internal clock or timer.

At operation 215, the processing logic determines a total power-off time of the memory sub-system 110. In one embodiment, to determine the total power-off time of the memory sub-system 110, the processing logic determines a difference between the power down time and the power up time, as indicated by the indications stored in memory device 130.

At operation 220, the processing logic identifies a configurable power-off time threshold for the memory sub-system 110. In one embodiment, the processing logic determines a representative usage metric of the memory sub-system 110, the configurable power-off time threshold is based on the representative usage metric. For example, the processing logic can determine a program-erase count (PEC) for one or more segments of the memory device 130. The PEC can represent a number of times that a given segment has been programmed and erased in a cycle. Depending on the embodiment, the PEC can be an average PEC of two or more segments of the memory device 130, a highest PEC of any one segment of the memory device 130, or some other representative value. In other embodiments, the representative usage metric can be some other information that represents how much a segment of the memory device 130 has been used, and thus how much wear and degradation the segment has experienced. In one embodiment, power-off time monitoring component 113 maintains one or more PEC counters for the segments of memory device 130 which are incremented in response to the occurrence of each program-erase cycle on the corresponding segment.

Figure 3:
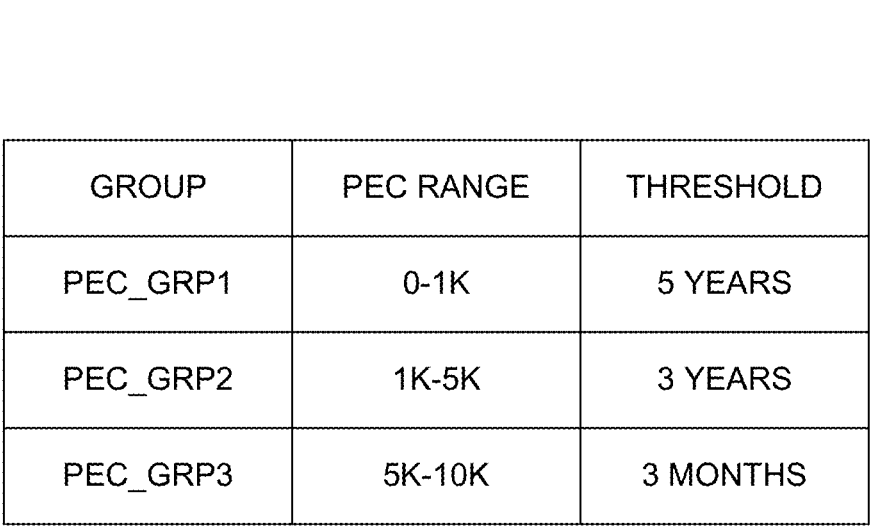
FIG. 3 is a diagram illustrating an example data structure storing configurable power-off time thresholds in accordance with some embodiments of the present disclosure.

In one embodiment, the processing logic uses the representative usage metric to determine a corresponding configurable power-off time threshold. For example, memory sub-system 110 may include a data structure, such as example data structure 300 shown in FIG. 3, storing configurable power-off time thresholds in accordance with some embodiments of the present disclosure. Data structure 300 can be stored, for example, on memory device 130 or in local memory 119 of the memory sub-system controller 115. In one embodiment, data structure 300 includes a number of program-erase groups, each having a corresponding range of PEC values. For example, a first group PEC_GRP1 can be associated with a PEC of 0-1K cycles, a second group PEC_GRP2 can be associated with a PEC of 1K-5K cycles, and a third group PEC_GRP3, can be associated with a PEC of 5K-10K cycles. Power-off time monitoring component 113 can use the representative usage metric to identify appropriate group (i.e., the group for which the determined PEC falls within the corresponding range of PEC values. Data structure 300 can further indicate a power-off time threshold associated with each group. For example, the first group PEC_GRP1 can have a threshold of 5 years, the second group PEC_GRP2 can have a threshold of 3 years, and the third group PEC_GRP3, can have a threshold of 3 months. Depending on the embodiment, the data structure 300 can have any different number of groups, different PEC ranges, and/or different power-off time thresholds.

Referring again to FIG. 2, at operation 225, the processing logic determines whether the total power-off time satisfies a threshold criterion based on the configurable power-off time threshold. In one embodiment, the processing logic compares the total power-off time determined at operation 215 to the power-off time threshold determined at operation 220, and determines whether the total power-off time is greater than or equal to the configurable power-off time threshold. If the total power-off time is greater than or equal to the configurable power-off time threshold, power-off time monitoring component 113 can determine that the threshold criterion is satisfied.

At operation 230, responsive to determining that the total power-off time satisfies the threshold criterion, the processing logic causes the memory sub-system to enter a relaxed block retirement mode of operation. In one embodiment, the processing logic sets a flag or changes a bit in a designated register to indicate the entry to the relaxed block retirement mode of operation. In the relaxed block retirement mode of operation, the processing device is to identify one or more blocks of the plurality of blocks that satisfy a block retirement criterion, and prevent the one or more blocks of the plurality of blocks from being retired. Additional details with respect to the relaxed block retirement mode of operation are provided below with respect to FIG. 4.

At operation 235, responsive to determining that the total power-off time does not satisfy the threshold criterion, the processing logic causes the memory sub-system to enter a normal block retirement mode of operation. In one embodiment, the processing logic sets a flag or changes a bit in a designated register to indicate the entry to the normal block retirement mode of operation. In the normal block retirement mode of operation, upon identifying one or more blocks of the plurality of blocks that satisfy a block retirement criterion, the processing logic retires those blocks, as described in more detail below with respect to FIG. 4.

Figure 4:
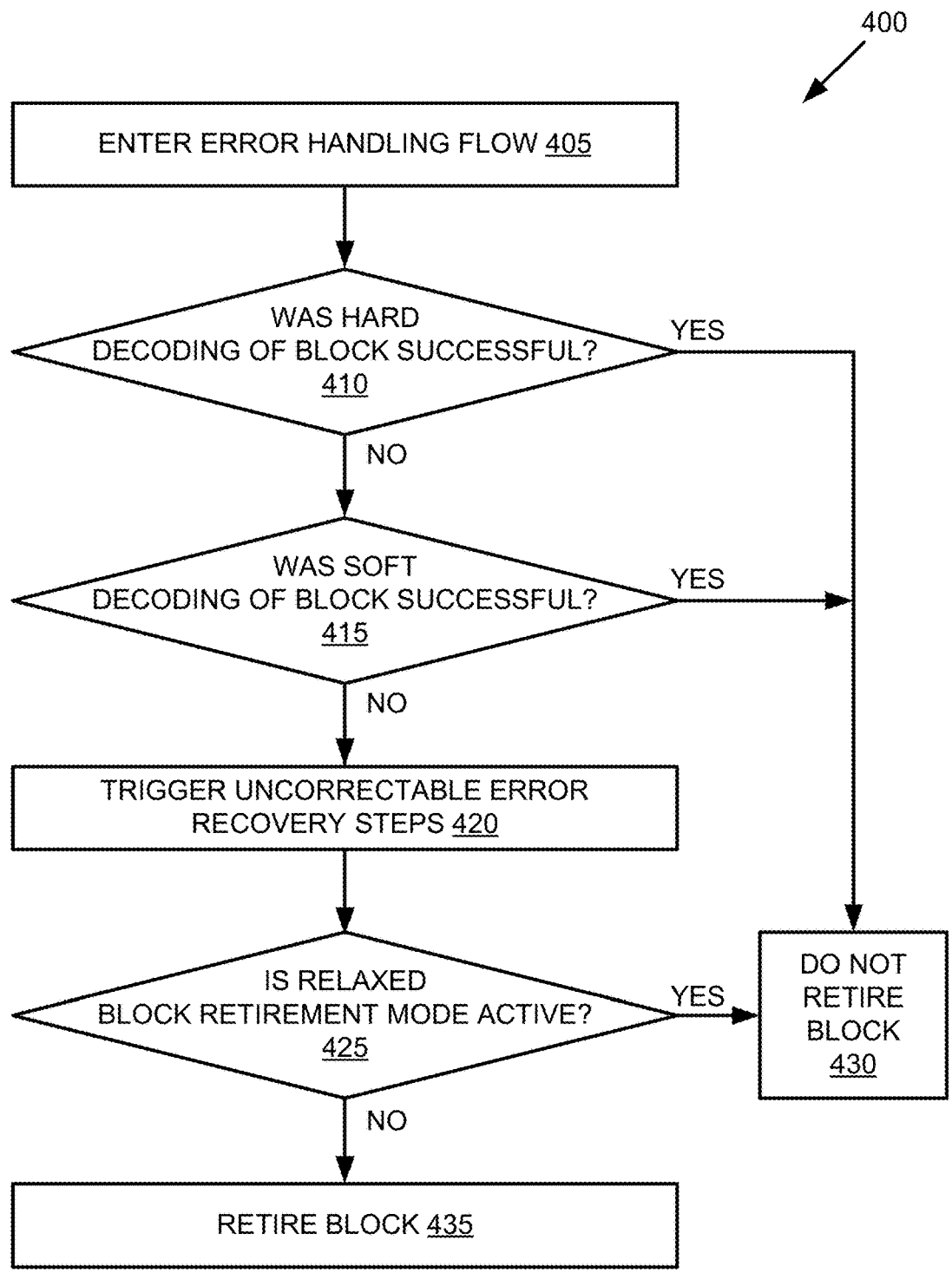
FIG. 4 is a flow diagram of an example method of relaxed block retirement in a memory sub-system in accordance with some embodiments of the present disclosure.

FIG. 4 is a flow diagram of an example method of relaxed block retirement in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by power-off time monitoring component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic (e.g., power-off time monitoring component 113) enters an error handling flow for memory sub-system 110. In one embodiment, when an error is encountered during a read operation (e.g., a hard read failure) with respect to a memory cell (e.g., a target cell), or when a bit error rate (BER) with respect to multiple cells is exceeded, a sequence of error handling operations (or sequence of recovery steps) can be undertaken. This sequence of operations can be referred to as the error handling flow. In one embodiment, the error handling flow includes a predefined list of operations which can be sequentially performed in a set order, in an attempt correct the error or improve the bit error rate. For example, the processing logic can perform the first operation in the predefined list, determine if the first operation is successful, and if not, proceed to the second operation. The operations in the error handling flow, and the corresponding order in which they are performed, can vary depending on the implementation. In one embodiment, however, the error handling flow includes a hard decoding operation, a soft decoding operation, and one or more uncorrectable error recovery steps.

At operation 410, the processing logic determines whether hard decoding of a given segment (e.g., a block) of memory device 130 was successful. A hard decoding operation can include the use of error correcting code (ECC), such as Hamming code or Reed-Solomon code to add redundant information to the data, which enables the detection and correction of certain errors. Some errors are too severe to be corrected by hard decoding, however. Accordingly, after attempting to correct any errors in the data, the processing logic can determine whether or not the hard decoding was successful. If so, processing can proceed to operation 430, where the segment is not retired and can continue to be used.

At operation 415, if the hard decoding of the segment was not successful, the processing logic determines whether soft decoding of the segment was successful. A soft decoding operation can include the use of statistical algorithms to estimate the most likely values of the data based on available information, such as the value of the surrounding bits. In some cases, soft decoding can correct errors that are beyond the capability of hard decoding, however, soft decoding may require more computational resources than hard decoding. Accordingly, after attempting to correct any errors in the data, the processing logic can determine whether or not the soft decoding was successful. If so, processing can proceed to operation 430, where the segment is not retired and can continue to be used.

At operation 420, if the soft decoding of the segment was not successful, the processing logic triggers one or more uncorrectable error recovery steps. In one embodiment, the uncorrectable error recovery steps utilize redundant array of independent NAND (RAIN) technology in an attempt to recover from errors that were not correctable using hard and soft decoding. RAIN uses parity data stored across multiple NAND devices to reconstruct data lost due to errors. RAIN provides a high degree of fault tolerance, and can recover data even after failure of multiple NAND devices, however, is complex and expensive due to the storage of additional parity data in each segment of the memory device.

At operation 425, the processing logic determines whether the relaxed block retirement mode of operation is active. As described above with respect to FIG. 2, responsive to determining that the total power-off time satisfies the threshold criterion, the processing logic causes the memory sub-system to enter the relaxed block retirement mode of operation. This can be indicated by the setting of a flag or a bit in a designated register. Accordingly, to determine whether the relaxed block retirement mode is active, the processing logic can check the status of that flag or bit.

At operation 430, if the relaxed block retirement mode of operation is active, the processing logic prevents the segment from being retired. In the relaxed block retirement mode of operation, the processing logic prevent the one or more segments from being retired. Under normal operation, these segments would have been retired due to the failure of the hard and soft decoding and the triggering of the uncorrectable error recovery steps. Although these segments may appear to be "bad blocks" (i.e., blocks that have failed due to deterioration of the underlying physical media), the activation of the relaxed block retirement mode indicates that these segments are intrinsically good blocks that are able to be reformatted and reused, and merely suffered significant charge loss due to data retention stress during the extended periods of power-off time. The relaxed block retirement mode prevents unnecessary retirement of intrinsically good blocks and allows for reformatting and reuse of blocks in the memory sub-system after long periods of power-off time.

At operation 435, if the relaxed block retirement mode of operation is not active, the processing logic cause the segment to be retired. Since the relaxed block retirement mode is not active, there is no indication that the segment suffered charge loss due to data retention stress, and thus the charge loss is most likely due to deterioration of the underlying physical media. Accordingly, the segment can be retired and not used for future operations.

Figure 5:
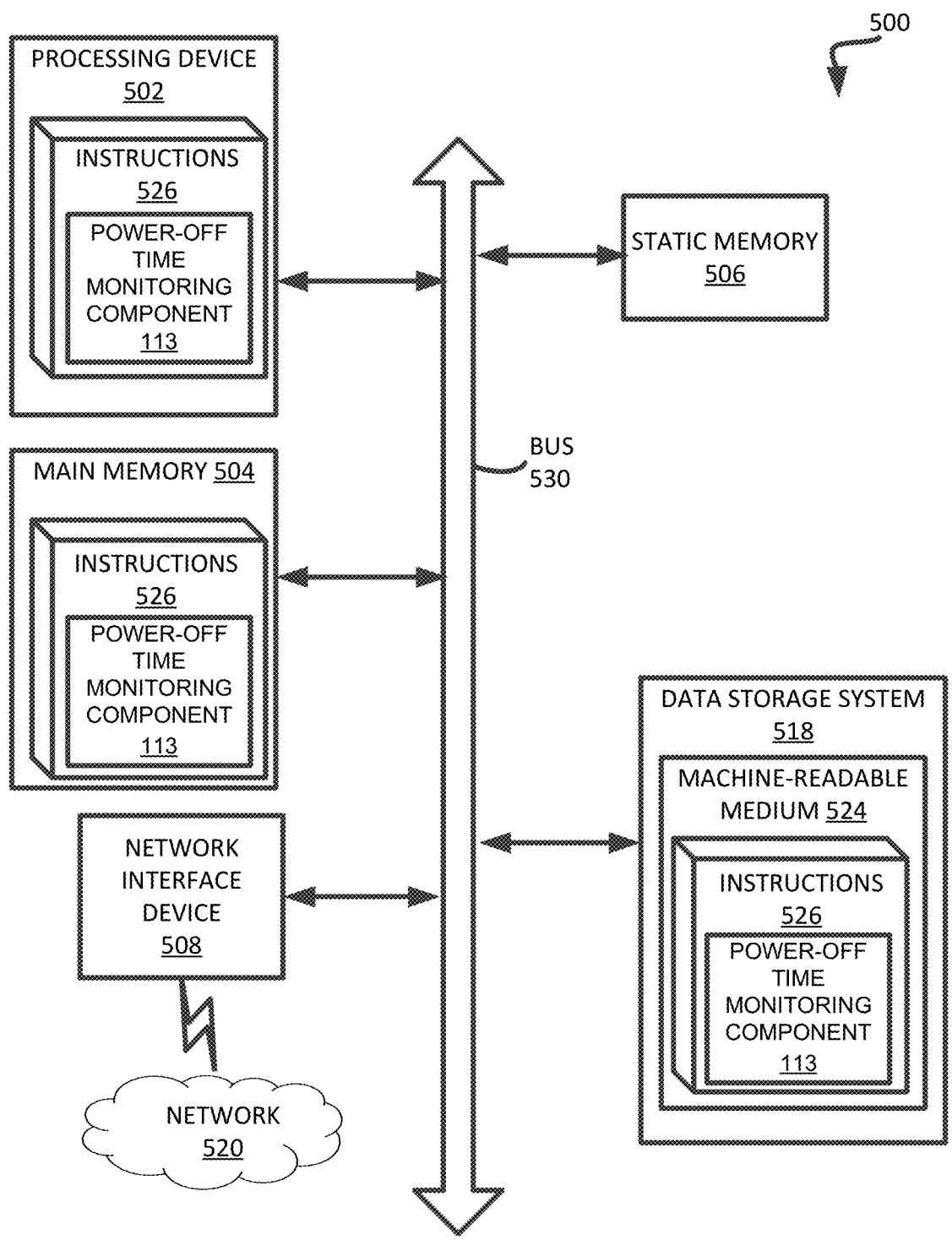
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the adaptive scan component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the adaptive scan component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
    a memory die comprising a plurality of blocks of memory cells;
    a processing device, operatively coupled with the memory die, to perform operations comprising:
        determining a total power-off time of the memory sub-system;
        identifying a configurable power-off time threshold for the memory sub-system, wherein the configurable power-off time threshold is based on a representative usage metric of the memory sub-system, and wherein the configurable power-off time threshold is reduced as the representative usage metric increases;
        determining whether the total power-off time satisfies a threshold criterion based on the configurable power-off time threshold; and
        responsive to determining that the total power-off time satisfies the threshold criterion, causing the memory sub-system to enter a relaxed block retirement mode of operation, wherein in the relaxed block retirement mode, blocks that would otherwise meet a block retirement criterion are prevented from being retired and are made available for reuse.

2. The memory sub-system of claim 1, wherein the processing device is to perform operations further comprising:
    detecting an occurrence of a power down event of the memory sub-system;
    acquiring an indication of a power down time associated with the power down event;
    detecting an occurrence of a power up event of the memory sub-system; and
    acquiring an indication of a power up time associated with the power up event.

3. The memory sub-system of claim 2, wherein determining the total power-off time of the memory sub-system comprises determining a difference between the power down time and the power up time.

4. The memory sub-system of claim 1, wherein identifying the configurable power-off time threshold for the memory sub-system comprises:
    determining the representative usage metric of the memory sub-system, wherein the representative usage metric comprises a program-erase cycle count for one or more blocks of the memory die.

5. The memory sub-system of claim 1, wherein determining whether the total power-off time satisfies the threshold criterion comprises:
    determining whether the total power-off time is greater than or equal to the configurable power-off time threshold.

6. The memory sub-system of claim 1, wherein the processing device is to perform operations further comprising:
    responsive to determining that the total power-off time does not satisfy the threshold criterion, causing the memory sub-system to enter a normal block retirement mode of operation.

7. The memory sub-system of claim 1, wherein in the relaxed block retirement mode of operation, the processing device is to:
    identify one or more blocks of the plurality of blocks that satisfy the block retirement criterion; and
    prevent the one or more blocks of the plurality of blocks from being retired.

8. A method comprising:
    determining a total power-off time of a memory sub-system;
    identifying a configurable power-off time threshold for the memory sub-system, wherein the configurable power-off time threshold is based on a representative usage metric of the memory sub-system, and wherein the configurable power-off time threshold is reduced as the representative usage metric increases;
    determining whether the total power-off time satisfies a threshold criterion based on the configurable power-off time threshold; and
    responsive to determining that the total power-off time satisfies the threshold criterion, causing, by a processing device, the memory sub-system to enter a relaxed block retirement mode of operation, wherein in the relaxed block retirement mode, blocks that would otherwise meet a block retirement criterion are prevented from being retired and are made available for reuse.

9. The method of claim 8, further comprising:
    detecting an occurrence of a power down event of the memory sub-system;
    acquiring an indication of a power down time associated with the power down event;
    detecting an occurrence of a power up event of the memory sub-system; and
    acquiring an indication of a power up time associated with the power up event.

10. The method of claim 9, wherein determining the total power-off time of the memory sub-system comprises determining a difference between the power down time and the power up time.

11. The method of claim 8, wherein identifying the configurable power-off time threshold for the memory sub-system comprises:

determining the representative usage metric of the memory sub-system, wherein the representative usage metric comprises a program-erase cycle count for one or more blocks of a memory die of the memory sub-system.

12. The method of claim 8, wherein determining whether the total power-off time satisfies the threshold criterion comprises:
determining whether the total power-off time is greater than or equal to the configurable power-off time threshold.

13. The method of claim 8, further comprising:
responsive to determining that the total power-off time does not satisfy the threshold criterion, causing the memory sub-system to enter a normal block retirement mode of operation.

14. The method of claim 8, wherein in the relaxed block retirement mode of operation, the processing device is to:
identify one or more blocks of a plurality of blocks that satisfy the block retirement criterion; and
prevent the one or more blocks of the plurality of blocks from being retired.

15. A non-transitory computer-readable storage medium comprising instructions that, when executed by a processing device, cause the processing device to perform operations comprising:
determining a total power-off time of a memory sub-system;
identifying a configurable power-off time threshold for the memory sub-system, wherein the configurable power-off time threshold is based on a representative usage metric of the memory sub-system, and wherein the configurable power-off time threshold is reduced as the representative usage metric increases;
determining whether the total power-off time satisfies a threshold criterion based on the configurable power-off time threshold; and
responsive to determining that the total power-off time satisfies the threshold criterion, causing the memory sub-system to enter a relaxed block retirement mode of operation, wherein in the relaxed block retirement mode, blocks that would otherwise meet a block retirement criterion are prevented from being retired and are made available for reuse.

16. The non-transitory computer-readable storage medium of claim 15, wherein the instructions cause the processing device to perform operations further comprising:
detecting an occurrence of a power down event of the memory sub-system;
acquiring an indication of a power down time associated with the power down event;
detecting an occurrence of a power up event of the memory sub-system; and
acquiring an indication of a power up time associated with the power up event.

17. The non-transitory computer-readable storage medium of claim 16, wherein determining the total power-off time of the memory sub-system comprises determining a difference between the power down time and the power up time.

18. The non-transitory computer-readable storage medium of claim 15, wherein identifying the configurable power-off time threshold for the memory sub-system comprises:
determining the representative usage metric of the memory sub-system, wherein the representative usage metric comprises a program-erase cycle count for one or more blocks of a memory die of the memory sub-system.

19. The non-transitory computer-readable storage medium of claim 15, wherein determining whether the total power-off time satisfies the threshold criterion comprises:
determining whether the total power-off time is greater than or equal to the configurable power-off time threshold.

20. The non-transitory computer-readable storage medium of claim 15, wherein in the relaxed block retirement mode of operation, the processing device is to:
identify one or more blocks of a plurality of blocks that satisfy the block retirement criterion; and
prevent the one or more blocks of the plurality of blocks from being retired.

* * * * *